(12) United States Patent
Wang

(10) Patent No.: US 10,054,258 B2
(45) Date of Patent: Aug. 21, 2018

(54) METHOD AND SYSTEM FOR CONTROLLING A GIMBAL

(71) Applicant: SZ DJI OSMO TECHNOLOGY CO., LTD., Shenzhen (CN)

(72) Inventor: Mingyu Wang, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/125,929

(22) PCT Filed: Mar. 14, 2014

(86) PCT No.: PCT/CN2014/073458
§ 371 (c)(1),
(2) Date: Sep. 13, 2016

(87) PCT Pub. No.: WO2015/135206
PCT Pub. Date: Sep. 17, 2015

(65) Prior Publication Data
US 2017/0002976 A1 Jan. 5, 2017

(51) Int. Cl.
*G05B 1/06* (2006.01)
*F16M 13/02* (2006.01)
(Continued)

(52) U.S. Cl.
CPC ........ *F16M 13/022* (2013.01); *F16M 11/126* (2013.01); *F16M 11/18* (2013.01);
(Continued)

(58) Field of Classification Search
CPC .... F16M 13/022; F16M 11/126; F16M 11/18; F16M 2200/00; G03B 17/561; H04N 5/2358
(Continued)

(56) References Cited

U.S. PATENT DOCUMENTS

| | | | |
|---|---|---|---|
| 5,963,749 A | 10/1999 | Nicholson | |
| 7,642,741 B2 * | 1/2010 | Sidman | F16M 11/041 318/638 |

(Continued)

FOREIGN PATENT DOCUMENTS

| | | |
|---|---|---|
| CN | 101917599 | 12/2010 |
| CN | 201750495 | 2/2011 |

(Continued)

OTHER PUBLICATIONS

International Search Report dated Dec. 23, 2014, in corresponding International Application No. PCT/CN2014/073458 issued by the State Intellectual Property Office of the P.R. China; 6 pages.

(Continued)

*Primary Examiner* — Todd M Epps
(74) *Attorney, Agent, or Firm* — Anova Law Group, PLLC

(57) ABSTRACT

The present invention discloses a method for controlling a gimbal used to carry a load. The method comprises: detecting a motion state of the gimbal or the load; determining whether a motion of the gimbal or the load is a user-intended motion according to the motion state; controlling the gimbal to move the load in an opposite direction to a moving direction of the motion if the motion is not a user-intended motion, thereby maintaining the load in an original posture; and controlling the load by the gimbal to move along a moving direction of the user-intended motion if the motion is a user-intended motion. The present invention also discloses a system for controlling a gimbal corresponding to the method for controlling a gimbal.

10 Claims, 4 Drawing Sheets

(51) Int. Cl.
*F16M 11/12* (2006.01)
*F16M 11/18* (2006.01)
*G03B 17/56* (2006.01)
*H04N 5/232* (2006.01)

(52) U.S. Cl.
CPC ....... *G03B 17/561* (2013.01); *H04N 5/23258* (2013.01); *F16M 2200/00* (2013.01)

(58) Field of Classification Search
USPC ...... 248/550, 182.1; 396/419; 318/649, 648, 318/638
See application file for complete search history.

(56) References Cited

U.S. PATENT DOCUMENTS

| | | | |
|---|---|---|---|
| 7,675,208 B2* | 3/2010 | Bandera | H02K 7/14 |
| | | | 310/254.1 |
| 8,310,551 B2 | 11/2012 | Jung | |
| 2011/0280565 A1 | 11/2011 | Chapman et al. | |
| 2014/0049643 A1* | 2/2014 | Segerstrom | F21V 21/30 |
| | | | 348/144 |
| 2016/0139584 A1* | 5/2016 | Caseley | F41H 11/02 |
| | | | 318/569 |

FOREIGN PATENT DOCUMENTS

| | | |
|---|---|---|
| CN | 202768245 | 3/2013 |
| CN | 103268124 | 8/2013 |
| CN | 103458184 | 12/2013 |
| CN | 103901897 | 7/2014 |
| CN | 103246290 | 9/2015 |
| DE | 10 2008 039 468 A1 | 3/2010 |
| WO | WO 2013/067335 A1 | 5/2013 |

OTHER PUBLICATIONS

English-language extended Search Report from the European Patent Office in counterpart European Application No. EP 14 88 5572.9 dated Apr. 5, 2017.

Hu Rei et al., *Exploring Filmography Using Small-Scaled Unman Aircrafts: Brief Analysis on Lens Utilization*, Advanced Television Engineering, pp. 126-130, Mar. 2016.

* cited by examiner

METHOD AND SYSTEM FOR CONTROLLING A GIMBAL

CROSS REFERENCE TO RELATED APPLICATIONS

This application is a national phase application of International Application No. PCT/CN2014/073458, filed Mar. 14, 2014, the content of which is incorporated herein by reference in its entirety.

TECHNICAL FIELD

The present invention relates to the technical field of gimbal control, particularly to a method and a system for controlling a gimbal.

BACKGROUND OF THE INVENTION

The quality of images captured by a camera may be greatly affected by shake, which may comprise small translation along an x, y, or z axis and rotation around the x, y, or z axis. In general, people may not be sensitive to the translation; however, the rotation may lead to significant influence on the images, that is, a slight rotation may result in a significant change in image content, thereby greatly affecting the quality of captured images.

An effective way to eliminate a shake of the camera may be desired. When a prior art camera rotates, it may not be possible to determine whether the rotation is caused by an intentional change in shooting angle by a user (a user-intended motion) or an unintended shake (a motion not desired by a user). As a consequence, a user-intended motion may be mistakenly eliminated, while a shake of the camera may not be accurately eliminated.

Therefore, there is a need to provide a method and system for controlling a gimbal to solve the above prior art problem.

SUMMARY OF THE INVENTION

The present invention provides a method and a system for controlling a gimbal. The method and system may solve a prior art problem in which it is not possible to determine whether a motion of a camera is a user-intended motion. As a consequence, a user-intended motion may be mistakenly eliminated, and the camera may not reach an expected shooting angle.

To solve the above technical problem, a technical solution proposed by the present invention may provide a method for controlling a gimbal used to carry a load, the method may comprise: detecting a motion state of the gimbal or the load; determining whether a motion of the gimbal or the load is a user-intended motion according to the motion state; if the motion is not a user-intended motion, controlling the gimbal to move the load in a direction opposite to a moving direction of the motion, thereby maintaining the load in an original posture, and if the motion is a user-intended motion, controlling the gimbal to move along the moving direction of the user-intended motion.

In some embodiments, detecting a motion state of the gimbal or the load may comprise detecting a rotation angle of the gimbal, and determining whether the motion of the gimbal is a user-intended motion according to the motion state may comprise determining whether the rotation angle exceeds a preset angle threshold, if the rotation angle exceeds the preset angle threshold, then the motion of the gimbal may be determined as a user-intended motion, and if the rotation angle does not exceed the preset angle threshold, then the motion of the gimbal may be determined as not a user-intended motion.

In some embodiments, the angle threshold may be less than a maximum rotation angle of the gimbal.

In some embodiments, detecting a motion state of the gimbal or the load may comprise detecting an angular velocity of the load, and determining whether the motion of the load is a user-intended motion according to the motion state may comprise determining whether the angular velocity exceeds a preset angular velocity threshold, if the angular velocity exceeds the preset angular velocity threshold, then the motion of the load may be determined as a user-intended motion, and if the angular velocity does not exceed a preset angular velocity threshold, then the motion of the load may be determined as not a user-intended motion.

In some embodiments, the gimbal may be mounted on a moving object, and detecting a motion state of the gimbal or the load may comprise detecting a control signal received by the moving object, and determining whether the motion of the gimbal or the load is a user-intended motion according to the motion state may comprise determining whether a control signal exists corresponding to a motion of the moving object, if a control signal exists corresponding to a motion of the moving object, then the motion of the gimbal may be determined as a user-intended motion, and if a control signal does not exist corresponding to a motion of the moving object, then the motion of the gimbal may be determined as not a user-intended motion.

To resolve the above technical problem, a technical solution proposed by the present invention may provide a system for controlling a gimbal used to carry a load, the system may comprise: a sensor configured to detect a motion state of the gimbal or the load; and a controller configured to determine whether a motion of the gimbal or the load is a user-intended motion according to the motion state; if the motion is not a user-intended motion, the controller may control the gimbal to move the load in an opposite direction to a moving direction of the motion not intended by a user, thereby maintaining the load in an original posture, if the motion is a user-intended motion, the controller may control the gimbal to move the load along a moving direction of the user-intended motion.

In some embodiments, the sensor may detect a rotation angle of the gimbal, and the controller may be configured to determine whether the rotation angle exceeds a preset angle threshold; if the rotation angle exceeds the preset angle threshold, the motion of the gimbal may be the user-intended motion, and if the rotation angle does not exceed the preset angle threshold, the motion of the gimbal may not be the user-intended motion.

In some embodiments, the angle threshold may be less than a maximum rotation angle of the gimbal.

In some embodiments, the sensor may detect an angular velocity of the load, and the controller may be configured to determine whether the angular velocity exceeds a preset angular velocity threshold; if the angular velocity exceeds the preset angular velocity threshold, the motion of the load may be the user-intended motion, and if the angular velocity does not exceed the preset angular velocity threshold, the motion of the load may not be the user-intended motion.

In some embodiments, the gimbal may be mounted on a moving object, and the controller may be configured to detect a control signal received by the moving object and to determine whether a control signal exists corresponding to a motion of the moving object; if a control signal exists corresponding to a motion of the moving object, the motion of the gimbal may be the user-intended motion, and if a control signal does not exist corresponding to a motion of the moving object, the motion of the gimbal may not be the user-intended motion.

The advantageous effects of the present invention may include: distinguished from the prior art, the present invention may detect a motion state of a gimbal or a load and determine whether a motion of the gimbal is a user-intended motion according to the motion state; therefore, a motion not intended by a user may be accurately eliminate, and a user-intended motion may not be eliminated.

DETAILED DESCRIPTION OF THE INVENTION

The present invention will be described in detail with reference to figures and embodiments.

Figure 1:
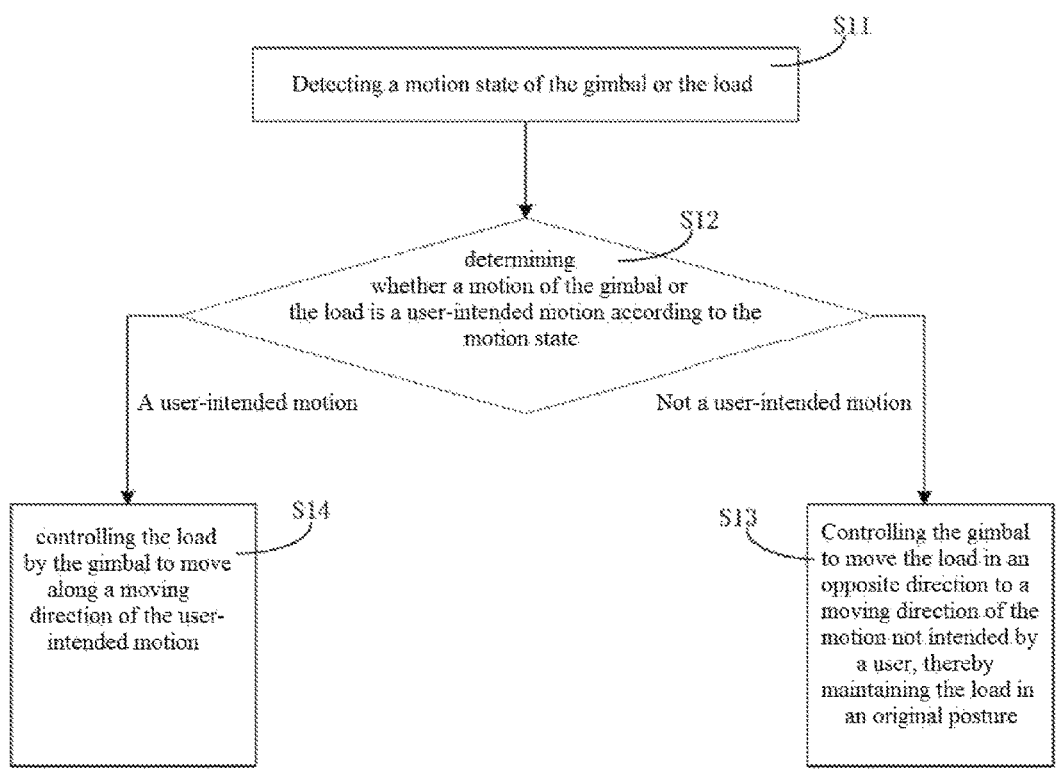
FIG. 1 is a flowchart of a first embodiment of a method for controlling a gimbal, in accordance with the present invention.

FIG. 1 is a flowchart of a first embodiment of a method for controlling a gimbal, in accordance with the present invention. The gimbal may be configured to carry a load. In some embodiments, the load may be a camera. The method for controlling the gimbal may comprise the following steps.

Step S11: detecting a motion state of the gimbal or the load.

Step S12: determining whether a motion of the gimbal or the load is a user-intended motion according to the motion state.

In step S12, if the motion is determined as not a user-intended motion, then a step S13 may be performed: controlling the gimbal to move the load in an opposite direction to a moving direction of the motion not intended by a user, thereby maintaining the load in an original posture. Otherwise, if the motion is determined as a user-intended motion, then a step S14 may be performed: controlling the gimbal to move along a moving direction of the user-intended motion.

In some embodiments, the user-intended motion may refer to a motion of the load or the gimbal which is desired by the user, while the motion not intended by a user may refer to a motion of the load or the gimbal which is not desired by the user.

Figure 2:
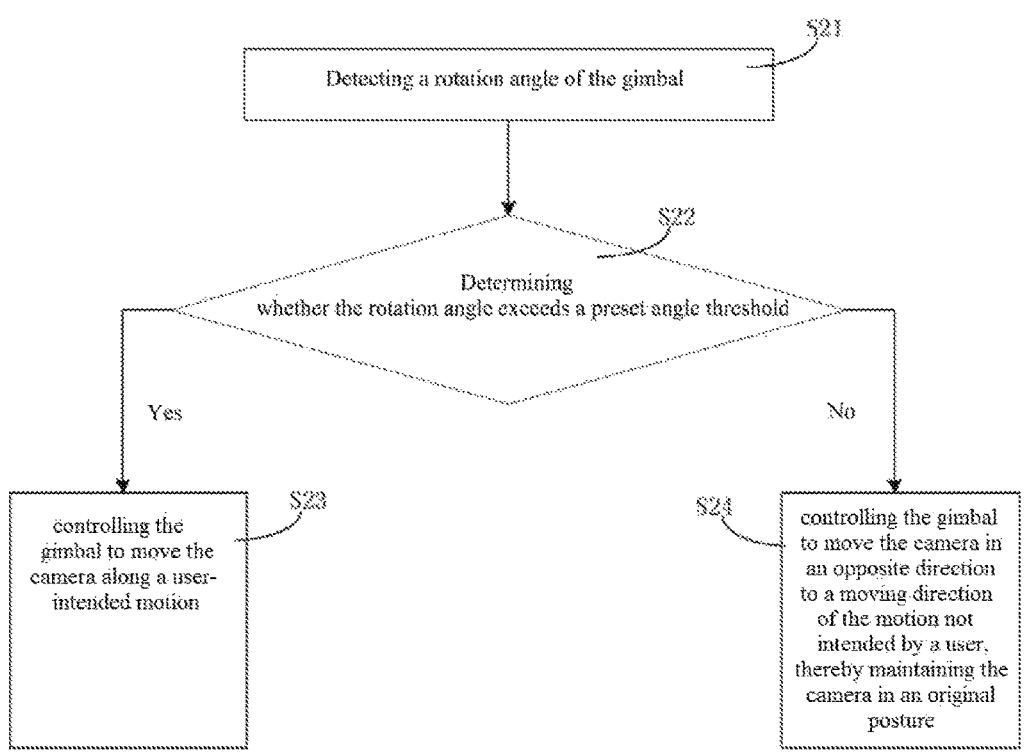
FIG. 2 is a flowchart of a second embodiment of the method for controlling a gimbal, in accordance with the present invention.

FIG. 2 is a flowchart of a second embodiment of the method for controlling a gimbal, in accordance with the present invention. The gimbal may be configured to carry a load. In some embodiments, the load may be a camera. The method for controlling the gimbal may comprise the following steps.

Step S21: detecting a rotation angle of the gimbal.

As for step S21, in some embodiments, the camera may be rotated by holding and rotating the gimbal with user's hand. In other embodiments, the camera may be rotated by a rotation of other devices.

Step S22: determining whether the rotation angle exceeds a preset angle threshold.

In step S22, the preset angle threshold may be less than a maximum rotation angle of the gimbal. In some embodiments, the preset angle threshold may be 15 degrees, and the maximum rotation angle of the gimbal may be 30 degrees. In other embodiments, the preset angle threshold may be different values, and the maximum rotation angle of the gimbal may also be different values.

In step S22, if the rotation angle exceeds the preset angle threshold, then the motion of the gimbal may be determined as a user-intended motion, and a step S23 may be performed: controlling the gimbal to move the camera along a user-intended motion. Otherwise, if the rotation angle does not exceed the preset angle threshold, then the motion of the gimbal may be determined as a motion not intended by a user, and a step S24 may be performed: controlling the gimbal to move the camera in an opposite direction to a moving direction of the motion not intended by a user, thereby maintaining the camera in an original posture.

In step S23, the motion of the gimbal may be a user-intended motion, which is intended to change a shooting angle of the camera. In this case, the gimbal may control the camera to move along with the gimbal, thereby facilitating the camera to uniformly change the shooting angle, such that images captured during the rotation may be more stable.

In step S24, the motion of the gimbal may be a motion not intended by a user. In this case, the gimbal may control the camera to rotate in an opposite direction to the rotating direction of the gimbal, thereby maintaining the camera in an original posture.

Figure 3:
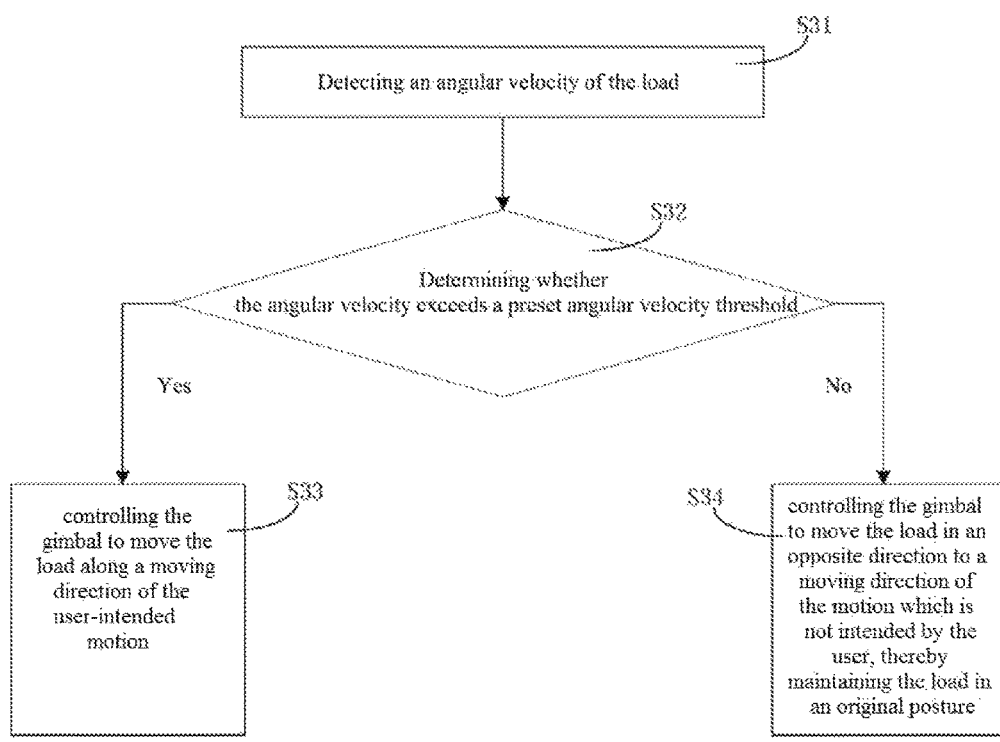
FIG. 3 is a flowchart of a third embodiment of the method for controlling a gimbal, in accordance with the present invention.

FIG. 3 is a flowchart of a third embodiment of the method for controlling a gimbal, in accordance with the present invention. The gimbal may be configured to carry a load. In some embodiments, the gimbal may be mounted on an aircraft, and the load may be a camera. In other embodiments, the gimbal may be mounted on a vehicle or other moving objects. In some embodiments, the method for controlling the gimbal may comprise the following steps.

Step S31: detecting an angular velocity of the load.

In step S31, the angular velocity of the load may be detected. A rotation of the load may generally comprise three types of rotation: a yaw rotation around a yaw axis (i.e., a rotation of the load along with the aircraft in a horizontal plane, taking a level flight of the aircraft as a reference), a roll rotation around a roll axis(i.e., a rotation of the load along with the aircraft in a vertical plane, in a direction of rotating the wings around the body of the aircraft), and a pitch rotation around a pitch axis(i.e., a rotation of the load along with the aircraft in a vertical plane, in a direction of rotating the body of the aircraft around the wings). Taking a yaw rotation as an example, the step 32 may comprise detecting the angular velocity of the yaw rotation around the yaw axis.

Step S32: determining whether the angular velocity exceeds a preset angular velocity threshold.

In step S32, if the angular velocity exceeds the preset angular velocity threshold, then the motion of the load may be determined as a user-intended motion, and a step S33 may be performed: controlling the gimbal to move the camera along a moving direction of the user-intended motion. Otherwise, if the angular velocity does not exceed the preset angular velocity threshold, the motion of the load may be determined as a motion not intended by a user, and a step S34 may be performed: controlling the gimbal to move the load in an opposite direction to a moving direction of the motion, thereby maintaining the load in an original posture.

If the detected angular velocity is less than the preset angular velocity threshold, the rotation may be considered as a rotation of the camera at a small angular velocity (i.e., a motion not intended by a user) which may be caused by instability of the aircraft during its flight (e.g., experiencing clouds or air turbulence). In this case, the camera may be controlled by the gimbal to move in an opposite direction to a rotating direction of the gimbal, thereby maintaining the camera in an original posture. If the detected angular velocity is greater than the preset angular velocity threshold, the aircraft may be considered as changing its yaw direction (i.e., a user-intended motion). In this case, the camera may be controlled by the gimbal to rotate together with the gimbal.

Figure 4:
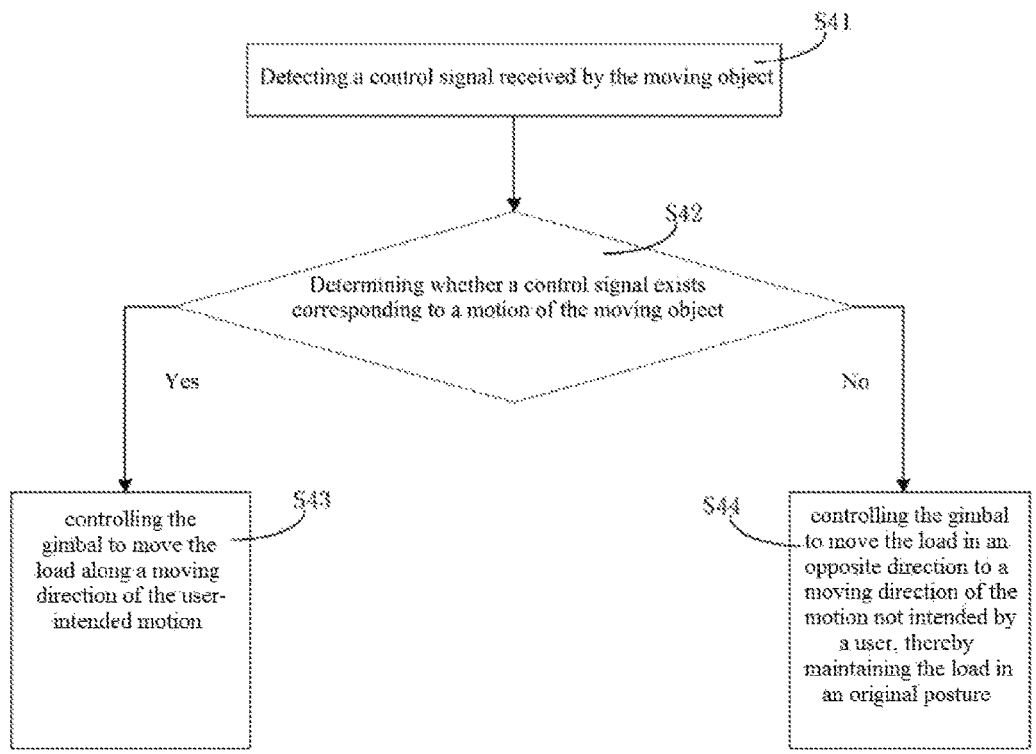
FIG. 4 is a flowchart of a fourth embodiment of the method for controlling a gimbal, in accordance with the present invention.

FIG. 4 is a flowchart of a fourth embodiment of the method for controlling a gimbal, in accordance with the present invention. In some embodiments, the gimbal may be configured to carry a load. The gimbal may be mounted on a moving object. In some embodiments, the moving object may be an aircraft. In other embodiments, the moving object may be a vehicle or other moving objects. In some embodiments, the method for controlling the gimbal may comprise the following steps.

Step S41: detecting a control signal received by the moving object.

Step S42: determining whether a control signal exists corresponding to a motion of the moving object.

In step S42, if a control signal exists corresponding to a motion of the moving object, then the motion of the gimbal may be determined as a user-intended motion, and a step S43 may be performed: controlling the gimbal to move the load along a moving direction of the user-intended motion. Otherwise, if a control signal does not exist corresponding to a motion of the moving object, the motion of the gimbal may be determined as a motion not intended by a user, and a step S44 may be performed: controlling the gimbal to move the load in an opposite direction to a moving direction of the motion not intended by a user, thereby maintaining the load in an original posture.

In some embodiments, a control signal being received by the aircraft may be detected to determine whether a control signal exists corresponding to a motion of the aircraft. In some instances, a control signal corresponding to the motion of the aircraft may be a control signal transmitted by the aircraft or a remote controller of the aircraft for controlling the yaw rotation of the aircraft. This kind of signal may be a control signal intended by the user. If there is a control signal intended by the user, then the motion of the gimbal may be determined as a user-intended motion, and the camera may be controlled by the gimbal to move along with the gimbal. Otherwise, if there is no control signal intended by the user, then the motion of the gimbal may be determined as a motion not intended by a user, and the camera may be controlled by the gimbal to rotate in an opposite direction to the rotating direction of the gimbal, thereby maintaining the camera in an original posture.

Figure 5:
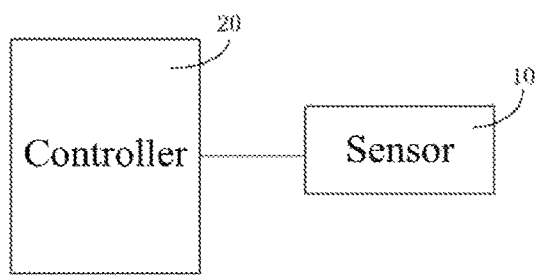
FIG. 5 is a module diagram of a system for controlling a gimbal, in accordance with the present invention.

FIG. 5 is a module diagram of a system for controlling a gimbal, in accordance with the present invention. In some embodiments, the gimbal may be configured to carry a load, and the load may be a camera.

In some embodiments, the system may comprise a sensor 10 and a controller 20.

The sensor 10 may be configured to detect a motion state of the gimbal or the load.

The controller 20 may be configured to determine whether a motion of the gimbal or the load is a user-intended motion according to the motion state. If the motion is a motion not intended by a user, the load may be controlled by the gimbal to move in an opposite direction to a moving direction of the motion not intended by a user, thereby maintaining the load in an original posture. Otherwise, if the motion is a user-intended motion, the load may be controlled by the gimbal to move along the moving direction of the user-intended motion.

In some embodiments, the sensor 10 may detect a rotation angle of the gimbal, and the controller 20 may be configured to determine whether the rotation angle exceeds a preset angle threshold. If the rotation angle exceeds the preset angle threshold, the motion of the gimbal may be determined as a user-intended motion; otherwise, the motion of the gimbal may be determined as a motion not intended by a user. In some embodiments, the angle threshold may be less than a maximum rotation angle of the gimbal. In some embodiments, the angle threshold may be 15 degrees, and the maximum rotation angle of the gimbal may be 30 degrees.

In some embodiments, the sensor 10 may be configured to detect an angular velocity of the load, and the controller 20 may be configured to determine whether a control signal exists corresponding to a motion of the moving object. If a control signal exists corresponding to a motion of the moving object, then the motion of the moving object may be determined as a user-intended motion. Otherwise, if a control signal does not exist corresponding to a motion of the moving object, then the motion of the moving object may be determined as a motion not intended by a user.

In some embodiments, the gimbal may be mounted on a moving object. The controller 20 may be configured to detect a control signal received by the moving object and to determine whether a control signal exists corresponding to a motion of the moving object. If a control signal exists corresponding to a motion of the moving object, then the motion of the gimbal may be determined as a user-intended motion. Otherwise, if a control signal does not exist corresponding to a motion of the moving object, the motion of the gimbal may be determined as a motion not intended by a user.

Distinguished from the prior art, the present invention may detect a motion state of a gimbal or a load and determine whether a motion of the gimbal or the load is a user-intended motion or a motion not intended by a user according to the motion state. Therefore, a motion not intended by a user may be accurately eliminated and a user-intended motion may not be eliminated.

The foregoing disclosure is merely illustrative of the embodiments of the invention but not intended to limit the scope of the invention. Any equivalent structural or equivalent flow changes, which are made without departing from the specification and the drawings of the invention, and a direct or indirect application in other relevant technical fields, shall also fall into the scope of the invention.

What is claimed is:

1. A method for controlling a gimbal used to carry a load, the method comprising:
   detecting a motion state of the gimbal or the load;
   determining whether a motion of the gimbal or the load is a user-intended motion according to the motion state;
   controlling the gimbal to move the load in an opposite direction to a moving direction of the motion, thereby maintaining the load in an original posture, if the motion is not a user-intended motion; and
   controlling the gimbal to move the load along the moving direction of the user-intended motion if the motion is a user-intended motion.

2. The method of claim 1, wherein detecting a motion state of the gimbal or the load comprises detecting a rotation angle of the gimbal, and wherein determining whether the motion of the gimbal is a user-intended motion according to the motion state comprises determining whether the rotation angle exceeds a preset angle threshold; the motion of the gimbal is determined as a user-intended motion if the rotation angle exceeds the preset angle threshold, while the motion of the gimbal is determined as not a user-intended motion if the rotation angle does not exceed the preset angle threshold.

3. The method of claim 2, further comprising obtaining the preset angle threshold that is less than a maximum rotation angle of the gimbal.

4. The method of claim 1, wherein detecting a motion state of the gimbal or the load comprises detecting an angular velocity of the load, and wherein determining whether the motion of the load is a user-intended motion according to the motion state comprises determining whether the angular velocity exceeds a preset angular velocity threshold; the motion of the load is determined as a user-intended motion if the angular velocity exceeds the preset angular velocity threshold, while the motion of the load is determined as not a user-intended motion if the angular velocity does not exceed a preset angular velocity threshold.

5. The method of claim 1, wherein the gimbal is mounted on a moving object, and detecting a motion state of the gimbal or the load comprises detecting a control signal received by the moving object, and wherein determining whether the motion of the gimbal or the load is a user-intended motion according to the motion state comprises determining whether a control signal exists corresponding to a motion of the moving object; the motion of the gimbal is determined as a user-intended motion if a control signal exists corresponding to a motion of the moving object, while the motion of the gimbal is determined as not a user-intended motion if a control signal does not exist corresponding to a motion of the moving object.

6. A system for controlling a gimbal used to carry a load, the system comprising:

a sensor that operates to detect a motion state of the gimbal or the load; and a controller that operates to: (1) determine whether a motion of the gimbal or the load is a user-intended motion according to the motion state; (2) control the gimbal to move the load in an opposite direction to a moving direction of the motion if the motion is not a user-intended motion, thereby maintaining the load in an original posture; and (3) control the gimbal to move the load along a moving direction of the user-intended motion if the motion is a user-intended motion.

7. The system of claim 6, wherein the sensor detects a rotation angle of the gimbal, and the controller is configured to determine whether the rotation angle exceeds a preset angle threshold; the motion of the gimbal is the user-intended motion if the rotation angle exceeds the preset angle threshold, while the motion of the gimbal is not the user-intended motion if the rotation angle does not exceed the preset angle threshold.

8. The system of claim 7, wherein the angle threshold is less than a maximum rotation angle of the gimbal.

9. The system of claim 6, wherein the sensor detects an angular velocity of the load, and the controller is configured to determine whether the angular velocity exceeds a preset angular velocity threshold; the motion of the load is the user-intended motion if the angular velocity exceeds the preset angular velocity threshold, while the motion of the load is not the user-intended motion if the angular velocity does not exceed the preset angular velocity threshold.

10. The system of claim 6, wherein the gimbal is mounted on a moving object, and the controller is configured to detect a control signal received by the moving object and to determine whether a control signal exists corresponding to a motion of the moving object; the motion of the gimbal is the user-intended motion if a control signal exists corresponding to a motion of the moving object, while the motion of the gimbal is not the user-intended motion if a control signal does not exist corresponding to a motion of the moving object.

* * * * *